United States Patent [19]
Walker et al.

[11] Patent Number: 5,682,602
[45] Date of Patent: Oct. 28, 1997

[54] METHOD AND APPARATUS FOR DECREASING MODEM RETRAINING DUE TO BLANK AND BURST SIGNALLING IN ANALOG CELLULAR SYSTEMS

[75] Inventors: Michael Rodney Walker; Peter Robert Henderson McConnell, both of Burnaby, Canada

[73] Assignee: Sierra Wireless, Inc., Richmond, Canada

[21] Appl. No.: 609,481

[22] Filed: Mar. 1, 1996

Related U.S. Application Data

[63] Continuation of Ser. No. 207,721, Mar. 9, 1994, abandoned.
[51] Int. Cl.$^6$ .................................................. H04Q 7/32
[52] U.S. Cl. .................. 455/33.2; 455/54.2; 375/222; 375/232
[58] Field of Search .................. 455/33.1, 33.2, 455/56.1, 54.1, 63, 69, 70; 375/222, 232; 379/59, 60

[56] References Cited

U.S. PATENT DOCUMENTS

| | | | |
|---|---|---|---|
| 4,654,867 | 3/1987 | Labedz et al. | 455/33.2 |
| 4,876,740 | 10/1989 | Levine | 455/33.2 |
| 5,257,397 | 10/1993 | Barzegar et al. | 455/33.1 |
| 5,319,674 | 6/1994 | Cherubini | 375/232 |
| 5,321,722 | 6/1994 | Ogawa | 375/222 |
| 5,475,710 | 12/1995 | Ishizu et al. | 375/232 |

FOREIGN PATENT DOCUMENTS

WO 86/00775  1/1986  WIPO.

OTHER PUBLICATIONS

CCITT, "A Duplex Modem Operating at Data Signalling Rates of up to 14 400 bits/s for Use on the General Switched Telephone Network and on Leased Point-to-Point 2-Wire Telephone-Type Circuits," Geneva, CH, pp. 1-22 (1991).
Frazer et al., "CDLC—A Data Transmission Standard For Cellular Radio," *Journal of the Institution of Electronic and Radio Engineers* —London GB, 57(No. 3) pp. 129–133 (1987).

*Primary Examiner*—Edward F. Urban
*Attorney, Agent, or Firm*—Burns, Doane, Swecker & Mathis LLP

[57] ABSTRACT

Modem throughput across a cellular mobile telephone network is increased by controlling the response of the modem to blank and burst orders. In the case of a power control order, the modem may be made aware of the fact that the channel has not changed. Significant performance gain in terms of channel throughput can then be achieved by avoiding a lengthy retraining procedure. The modem operation may be suspended during the blank and burst order and enabled after the blank and burst order, avoiding an unnecessary retrain procedure during the blanking period. In the case of a handoff, the modem may be directed to immediately perform a retrain procedure rather than wait for the long blanking period to be detected by the modem or the link access procedure.

13 Claims, 5 Drawing Sheets

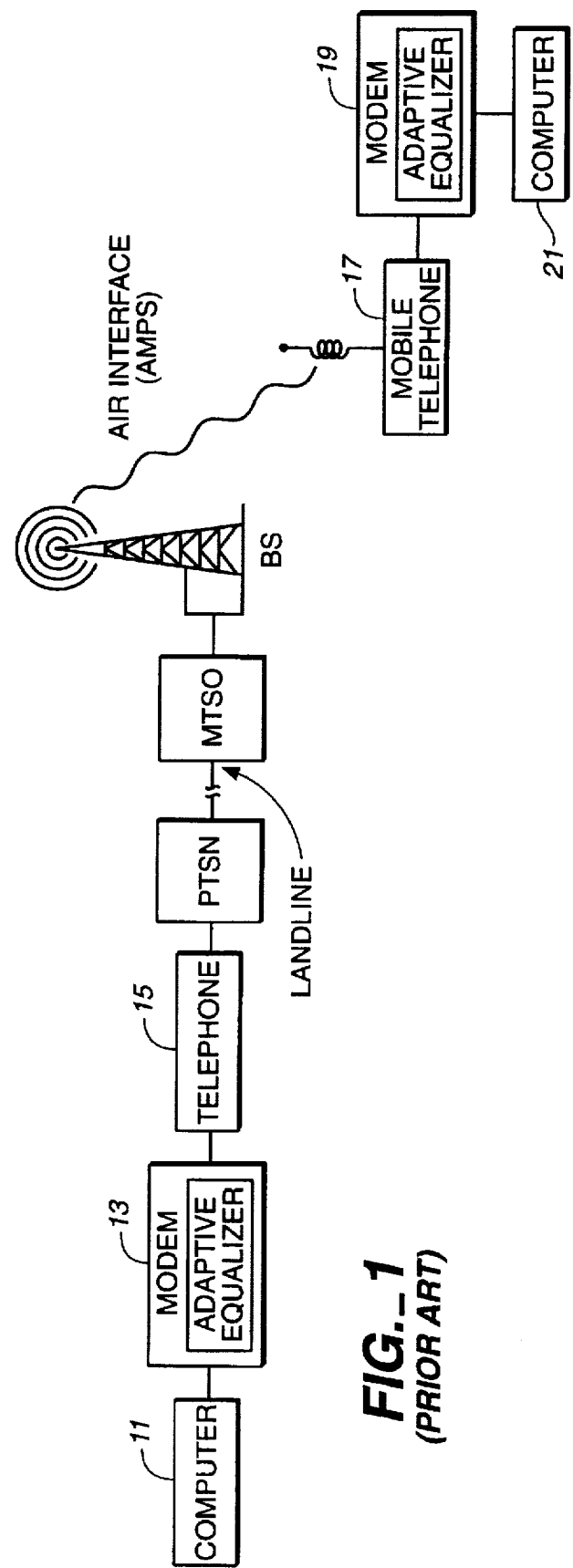

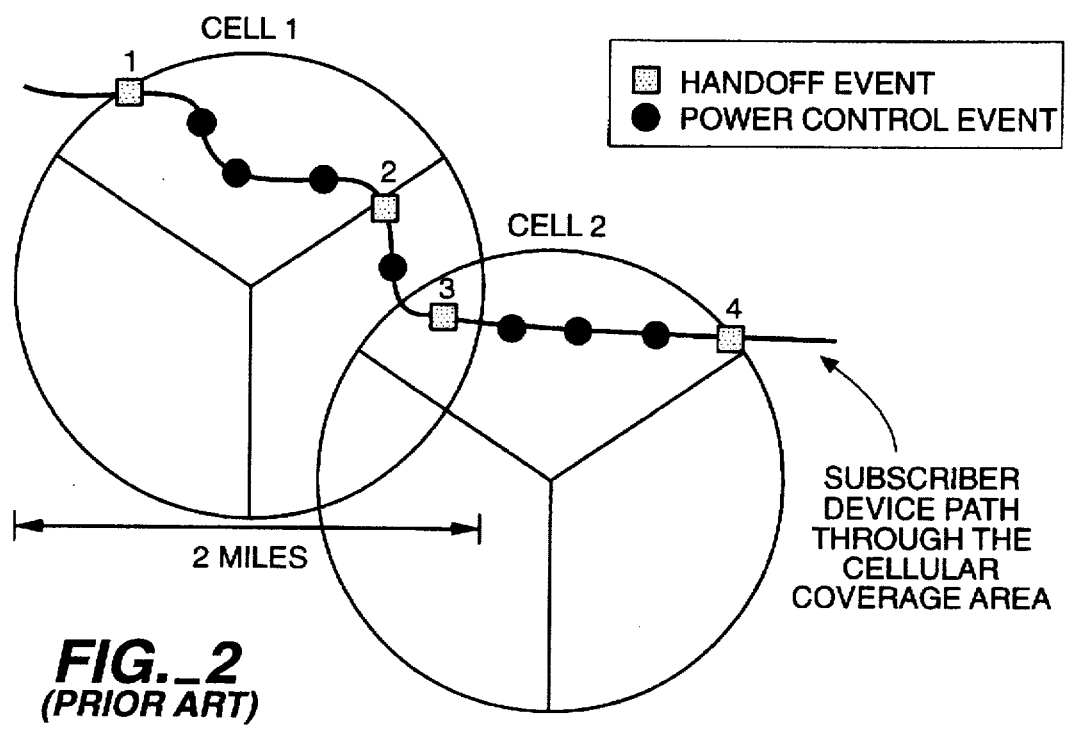
FIG._2
*(PRIOR ART)*
| WORD 1 | | | |
|---|---|---|---|
| SCC | ORDER | | PARITY |
| 2　2　2　9 | 5　3 | 5 | 12 |
FIG._4
*(PRIOR ART)*

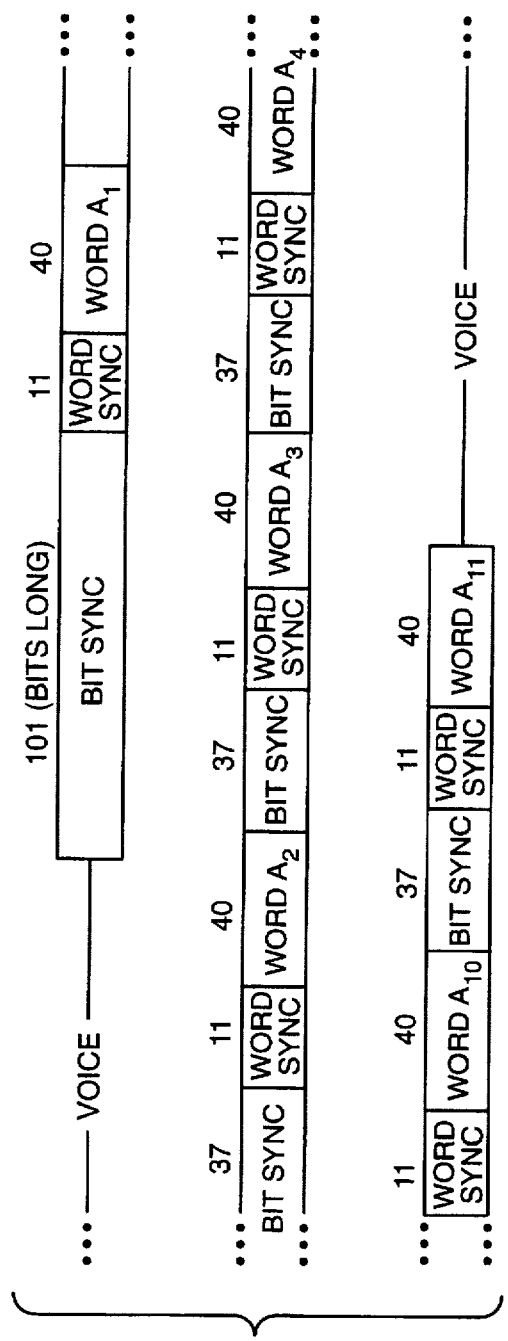
FIG._3
*(PRIOR ART)*
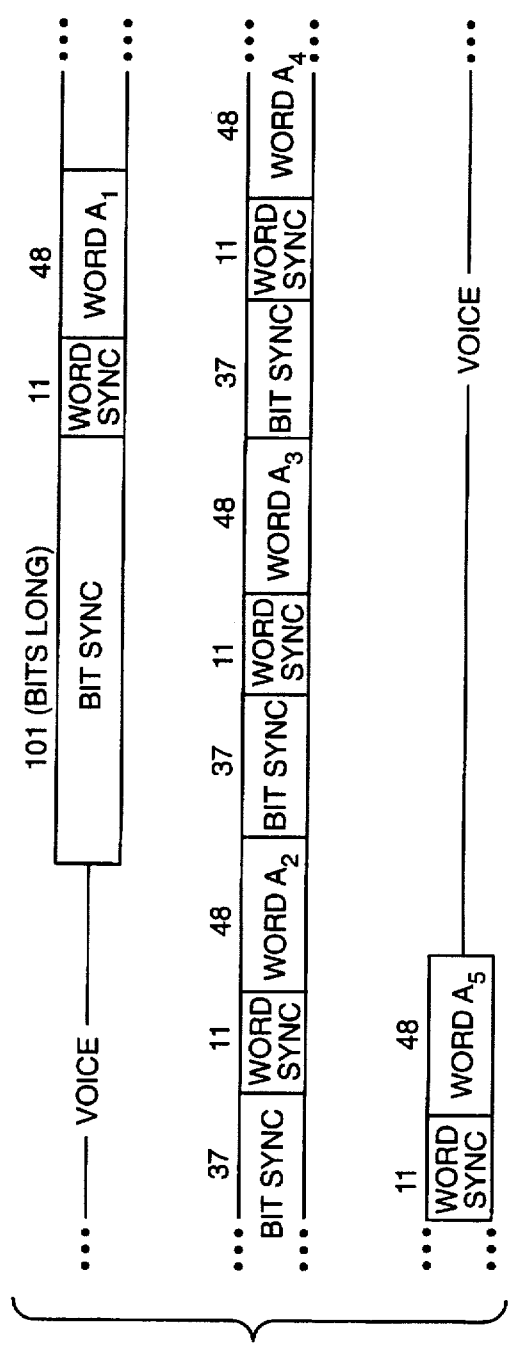
FIG._5
*(PRIOR ART)*

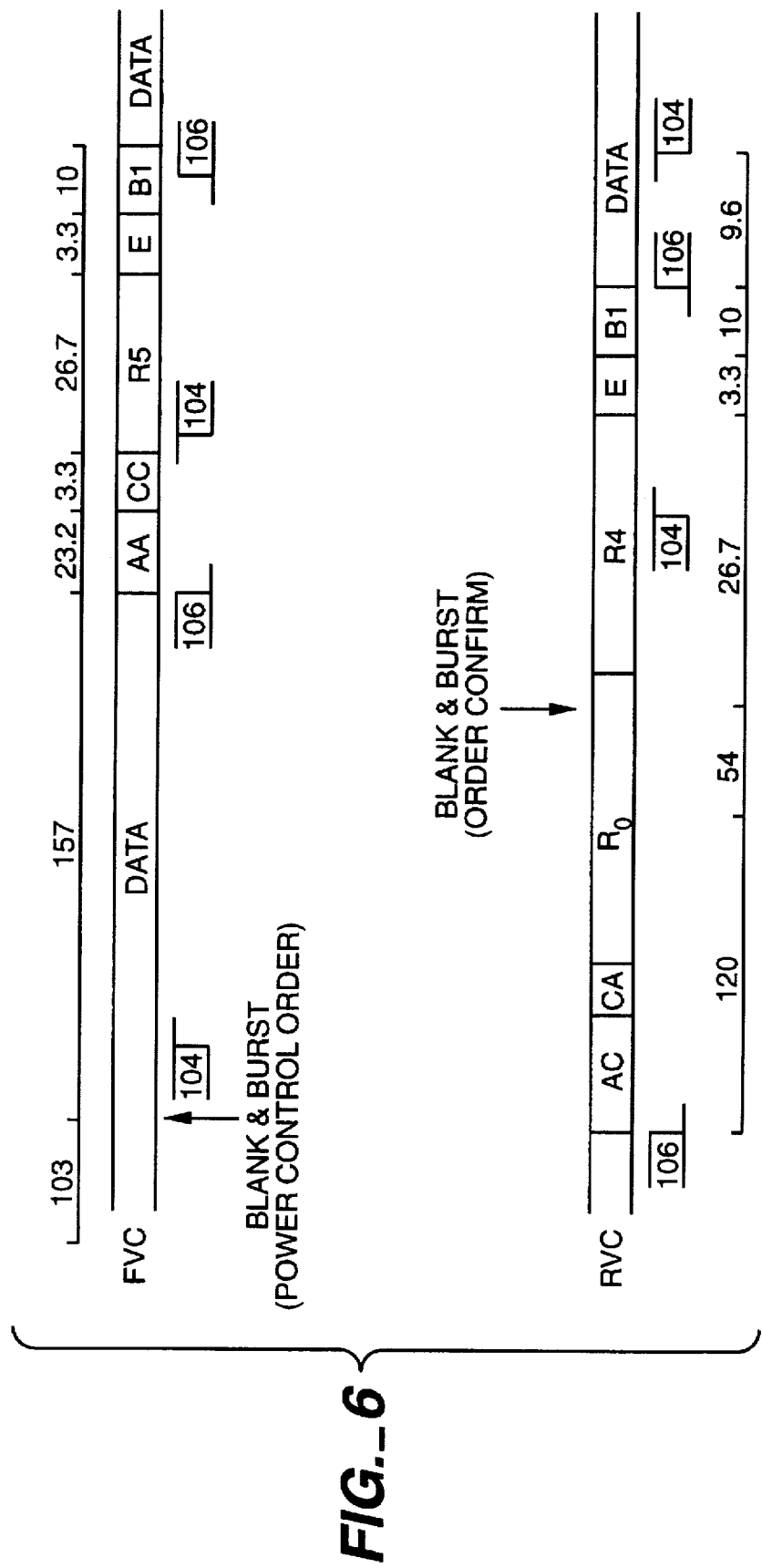
FIG._6

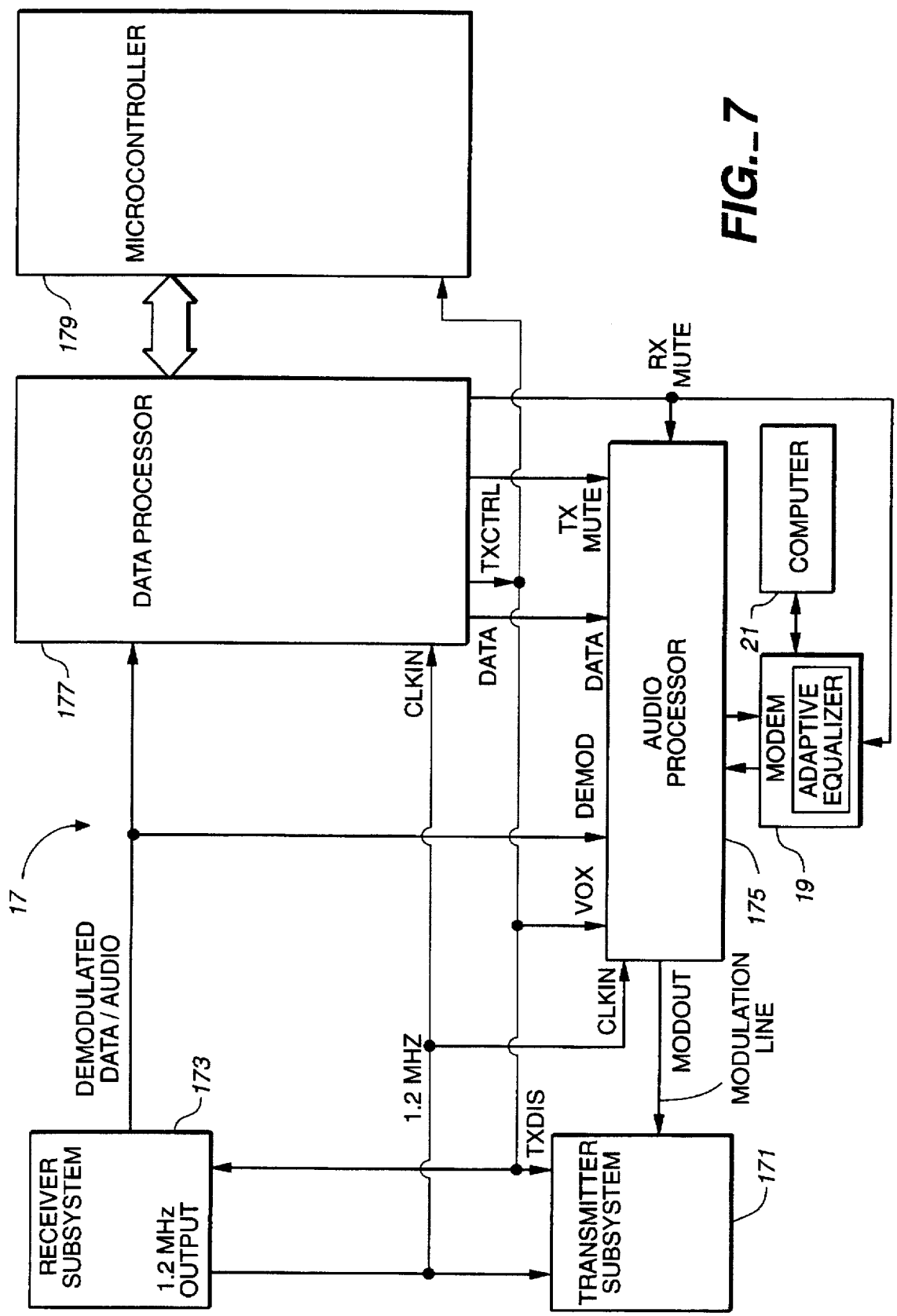
FIG._7

METHOD AND APPARATUS FOR DECREASING MODEM RETRAINING DUE TO BLANK AND BURST SIGNALLING IN ANALOG CELLULAR SYSTEMS

This application is a continuation of application No. 08/207,721, filed Mar. 9, 1994, now abandoned.

BACKGROUND OF THE INVENTION

1. Field of the Invention

The present invention relates to the transmission of data over the cellular mobile telephone network, in particular the analog cellular mobile telephone network.

2. State of the Art

In a cellular mobile telephone system, a base station provides radio coverage of a given geographical area. The base station contains channel units, each equipped with a radio transmitter, a radio receiver, and a control unit. The majority of channel units are voice channel units which carry one call at a time. The control unit performs data communication with a Mobile Telephone Switching Office (MTSO), which constitutes an interface between the radio system and the Public Switching Telephone Network (PSTN). Calls to and from mobile subscribers are switched by the MTSO, which also provides all signalling functions needed to establish the calls.

Each base station is connected to the MTSO by digital or analog connections for speech and data communications.

A mobile station is typically a transportable, car-mounted, or pocket telephone consisting of a radio transmitter and receiver, a logic unit for data signalling with the base station, and the usual telephone keypad, microphone, etc.

When a voice call involving a mobile subscriber has been set up, speech is transmitted on the radio path between the mobile station and a voice channel unit of a base station situated close to the mobile station. Typically, a voice line connection conveys the speech to the MSTO, where it is switched to the PSTN.

Aside from voice communications, digital data may also be transmitted over the analog cellular mobile telephone network. Such a situation is illustrated in FIG. 1. A first computer 11 is connected to a first modem 13. The first modem is connected to a telephone connected to the PSTN. The PSTN is connected by a landline to the MSTO, which is connected to a base station by a trunk line, for example. The base station communicates across an air interface to a mobile telephone 17 (the mobile station) connected to a second modem 19 and a second computer 21. The modems may be, for example, 14.4 kbps V.32 bis modems, and the air interface may be one specified in the AMPS cellular mobile telephone system. Digital data may also be transmitted over the analog cellular mobile telephone network from one mobile subscriber to another, through the base station.

When the transmission quality during a call in progress deteriorates because the mobile station has moved away from the base station, the call may be automatically switched to another cell or base station. Switching a call in progress from one base station to another is known as handoff. Also, during the course of a call, the mobile station may be requested by the base station to raise or lower its output power. The need for power adjustment arises because the mobile station can at various times be far away from its present base station or very close to its base station.

Handoff and power adjustment orders are interspersed with voice information and transmitted as necessary from the base station to the mobile station on a Forward Voice Channel (FVC). The mobile station responds to such orders by transmitting an order confirmation message on a Reverse Voice Channel (RVC). Order confirmation and other messages are interspersed with voice information and transmitted as necessary from the mobile station to the base station on the RVC. Examples of possible signalling formats for the FVC and RVC are shown in FIG. 3 and FIG. 5, respectively. An example of a possible order format for the FVC is shown in FIG. 4.

Hence, after call setup in a cellular system, although the voice channel provided to the user is essentially continuous, if the user is mobile (i.e. moving about the cellular coverage area), there are interruptions in the forward and reverse voice channels to manage cell-to-cell handoff, RF power control, and channel supervision operations.

The following references contain additional information useful in understanding the procedures discussed in the present application and are incorporated herein by reference:

The Cellular Radio Handbook, Neil J. Boucher, Quantum Publishing, 1990 (ISBN 0-930633-17-2).

Mobile Communications Engineering, William C. Y. Lee, McGraw-Hill Book Company, 1982 (ISBN 0-07-037039-7).

Recommendation V.32 bis, Data Communication Over The Telephone Network—A Duplex Modem Operating At Data Signalling Rates Up To 14 400 bit/s For Use On The General Switched Telephone Network And On Leased Point-To-Point 2-Wire Telephone Type Circuits, CCITT, 1991.

During both handoff and power control events, the forward voice channel (FVC) is muted and the corresponding digital order is given on that channel. The same physical channel is used for both voice and signalling, except that for voice an analog FM voice channel exists and for the signalling "order" a 10 kbps Manchester encoded data channel exists. A number of additional orders are given on the FVC; however, other orders occur less frequently on average than handoff and power control orders and, in any event, can be treated exactly the same as the power control order.

During these "blank and burst" interruptions, the user is aware of them as brief blank periods but they do not prove to be an annoyance for a typical voice call. However, high speed data modems such as V.32 bis devices can treat these events as a case of unsatisfactory signal reception and cause the modem to initiate a long and involved retrain procedure. This procedure causes the modem to initiate an equalizer retraining procedure and possibly to retransmit any data lost during the brief interruption which initiated the retrain procedure. Depending on the modem, it could fall back to a much slower data rate even though the channel could still support a much higher one. This data rate fall-back could be done as a result of a large number of retrain procedures being executed in a fixed period of time, resulting in lower throughput to the user.

Handoff is a relatively infrequent event. Assuming a three-sectored cell with a radius of one mile as shown in FIG. 2 and a typical velocity of 30 m.p.h., an average handoff rate can be estimated. Based on this cell plan, a handoff will occur on average approximately every 1 mile of travel. At 30 m.p.h. (44 feet per second), a handoff will therefore occur once every 120 seconds. The mobile subscriber device may switch to a different channel in the same cell (shown as handoff event 2 in FIG. 2) or to a different channel in a different cell (shown as handoff events 1, 3, and 4 in FIG. 2). In either case, the baseband characteristics of the channel will most likely be different enough to require that modem initiate a retrain procedure. This retraining is required because of the compound effects of:

1. selection of different trunk mute between the MTSO and the PSTN Central Office (CO); and
2. different group delay and amplitude characteristics between the base station receivers.

Power control is a much more frequent event because of the narrow range of signal levels used by the base station to control interference and the large RF propagation-path loss (about −38.4 dB/decade). If a subscriber device entered a cell after a handoff and set the transmit power such that the received signal level at the base station was, say, −82 dBm and then drove towards the center of the cell site and handed off to the next sector, there would be approximately 8 power control orders from the base. The minimum number of power control orders would be zero and the maximum would be 14. In the case of power control, it is not really necessary for the V.32 bis modem to initiate a retrain procedure. The nature of the baseband channel has not changed, since only a change in RF power level to control RF interference within the cell or sector has been requested; however, because of the blank and burst nature of the FVC order the modem could initiate the retrain procedure. Channel throughput may therefore be significantly degraded.

SUMMARY OF THE INVENTION

The present invention, generally speaking, increases modem throughput across a cellular mobile telephone network by controlling the response of the modem to blank and burst orders. In the case of a power control order, the modem may be made aware of the fact that the channel has not changed. Significant performance gain in terms of channel throughput can then be achieved by avoiding a lengthy retraining procedure. The modem operation may be suspended during the blank and burst order and enabled after the blank and burst order, avoiding an unnecessary retrain procedure during the blanking period. In the case of a handoff, the modem may be directed to immediately perform a retrain procedure rather than wait for the long blanking period to be detected by the modem or by the link access procedure.

BRIEF DESCRIPTION OF THE DRAWING

The present invention may be further understood from the following description in conjunction with the appended drawing. In the drawing:

FIG. 1 is a simplified diagram showing a data connection between two modems being carried across a portion of a cellular mobile telephone network;

FIG. 2 is a diagram of part of a cell plan and a subscriber device path through the cellular coverage area;

FIG. 3 is a diagram of a signalling format that may be used on the Forward Voice Channel (FVC) of the cellular system;

FIG. 4 is a diagram of an order format that may be used on the Forward Voice Channel (FVC) of the cellular system;

FIG. 5 is a diagram of a signalling format that may be used on the Reverse Voice Channel (RVC) of the cellular system;

FIG. 6 is a timing diagram of an interworking procedure that may be used by the modems of FIG. 1 during a blank and burst condition in accordance with the present invention; and FIG. 7 is a block diagram showing in greater detail portions of the mobile telephone of FIG. 1 in relation to an associated modem and computer.

DETAILED DESCRIPTION OF THE PREFERRED EMBODIMENTS

The present description provides quantitative estimates of the amount of time required for modem retraining and administrative functions for a V.32 bis modem using a cellular radio channel. Retraining of the modem may be initiated during the blank and burst periods of the forward and reverse voice channels. As shown hereinafter, power control orders over these channels have the greatest impact on the modem and the channel throughput. A procedure is described which allows the modem to initiate a retrain procedure for handoffs and to inhibit retrain procedures during power control orders (and other administrative orders) so as to greatly enhance the overall channel throughput available to the user. Although for convenience of description a V.32 bis modem has been assumed, the present invention is broadly applicable to modems of all types as such modems are used in an analog cellular telephone network.

The procedure to maximize the channel throughput requires that the mobile telephone (or, more generally, the subscriber device) perform the following functions:
1. Recognize an order from the base station on the FVC.
2. Pause the modem during a blank and burst period.
3. Enable the modem at the end of the blank and burst period.
4. Inhibit the modem from initiating a retrain procedure during or after the blank and burst period of a power control or supervisory order, or initiate a retrain procedure after the blank and burst period of a handoff order.

Initiating a retrain procedure after a handoff order does not significantly increase channel throughput, but it does help prevent the modem from falling back to a lower speed after handoff. The modem is therefore able to operate at the maximum sustainable speed for the channel throughout the connection, and therefore maintain the highest possible throughput for the channel. Faster data transmission results in lower billed time to the user.

Referring to FIG. 7, a subscriber device 17 typically includes a transmitter subsystem 171, a receiver subsystem 173, and an audio processor 175, all of which are controlled by a data processor 177 and/or microcontroller 179. A reference frequency generator (part of the receiver subsystem in this example) provides a clock signal to the transmitter subsystem, the audio processor, and the data processor. The receiver subsystem receives frequency-modulated "voice" or data signals and demodulates those signals. In the case of a modem connection instead of a voice connection, the "voice" signal is in reality a modem signal. Demodulated data signals are input to the data processor. Demodulated "voice" signals are input to the audio processor where they are processed and output to the modem 19. Conversely, the audio processor, in the case of a modem connection, receives "voice" signals from the modem 19 and data signals from the data processor 177. The audio processor performs speech or data modulation on these signals to produce a modulation signal that is input to the transmitter subsystem.

The data processor enables or disables operation of the radio transceiver by means of a signal TXCTRL, which is input to the receiver subsystem, the transmitter subsystem, the audio processor, and the microcontroller. A signal TXMUTE is used to mute the transmitted audio path when control information is to be transmitted instead. A signal RXMUTE is used to mute the received (forward channel) audio path when a dotting and work synch signal is detected.

Blanking of the forward channel audio path at the subscriber device is typically initiated when the data processor of the subscriber device detects at least 32 bits of a 101-bit initial bit synch sequence in FIG. 3, which is followed by an 11-bit word synch. The data processor then asserts the audio path mute signal RXMUTE to cause "blanking" of the audio path.

The RXMUTE signal may be used to signal the V.32 bis modem that audio is about to be muted and that the baseband modem signal will be interrupted. Referring still to FIG. 7, the RXMUTE signal (in addition to being connected to the audio processor) is connected to the modem 19 in order to signal the modem that audio is about to be muted. When the RXMUTE signal becomes active, the V.32 bis modem then sets a circuit 106 (Ready For Sending, not shown, described more fully in Recommendation V.32 bis) to a logic LO level, signalling that the modem is not able to receive data from the sending modem. The modem then initiates a rate negotiation procedure if the FVC order was a power control order or a retrain procedure if the FVC order was a handoff order. The procedures to be followed in these two cases are detailed in the following description.

It should be noted that in the following description, the procedures described are those for the answering modem initiating the procedure. These procedures could just as easily be initiated by the calling modem, with only very slight changes being required (e.g., different preamble sequences, such as AAAAAA . . . AAAACCCC . . . instead of ACACAC . . . ACACCACA . . . ).

During normal voice transmission, a Supervisory Audio Tone (SAT) is superimposed on the voice signal above the audio range. Different SATs are associated with different voice channels, providing a means of ensuring that a mobile station locks onto the correct channel. Typically three different SATs are used. They are assigned the SAT Color Codes (SCC) 00, 01 and 10, respectively. The SAT color code 11 does not indicate an actual supervisory audio tone but is used in certain instances for signalling purposes. In particular, SCC=11 is used to designate an Order Message on the Forward Voice Channel (FVC).

If the message on the FVC is a Power Adjustment Order Message (the SAT Color Code is set to binary 11), the modem is inhibited from initiating a retrain procedure after the blanking period is finished (approx 100 ms later) as would normally occur. The modem then has a period of 100 ms during the blanking period in which to change the power level of the subscriber equipment and send an order confirmation.

When the mobile station detects a blank and burst sequence and an associated FVC Order Message on the forward channel, the mobile station responds to the order and sends an order confirmation message on the reverse channel, which in turn causes a blank and burst signal on the reverse channel. In the case of a call between a mobile station modem and a land-line modem, the land-line modem may be oblivious to whether the other connection is to a mobile station modem or another land-line modem. The land-line modem does not have any way to detect a blank and burst condition as such and to respond accordingly. Instead, the mobile station is charged with engaging the land-line modem during the blank and burst condition so that the land-line modem does not interpret the blank and burst condition as a bad connection, for example. The rate negotiation procedure of V.32 bis is used for this purpose.

When the mobile station receives a blank and burst sequence on the forward channel, indicated by an FVC Order Message with the SAT color code set to binary 11, it immediately undertakes to do the following:

1. Clamp circuit 106, Ready For Sending, to a logic LO to inhibit any further data transmission.

2. Send AC for 56 clock periods (56T) and CA for 8T.

3. Follow this by 32 (or possibly more) repeated patterns of the pair of "dummy" rate signals, denoted $R_0$, of: 0000110111011001 0000101110110001

4. Following the repeated dummy rate signals, send the correct rate signal R4, which is set to indicate the same data rate which was in use prior to the blank and burst period.

5. From this point on, handle the rate negotiation as specified in V.32 bis.

Two considerations dictate sending the two 16-bit patterns given in step 3. The first is that a rate change is specified only when two identical rate signals occur in succession, followed by one 16-bit E-sequence (End sequence). The words chosen in step 3 above are not the same to ensure that they cannot be interpreted as a correct rate change, and are thus ignored by the receiving modem. The other consideration is that the duration of the rate signal sent by the modem initiating the procedure is the only field sent which is not of fixed duration. The only requirement is that it be greater than 26.7 ms. The duration of the rate signal sent by the modem initiating the procedure may therefore be prolonged to bridge the blank and burst period for the land-line modem. The particular pattern chosen for use in step 3 has a Hamming distance dmin of 5 to increase its tolerance to errors (i.e., the chance that errors in the $R_0$ sequence may cause two sequential rate signals to be the same).

The foregoing procedure is shown in detail in FIG. 6. Referring to FIG. 6, the mobile station detects a blank and burst sequence and the associated FVC Order Message on the forward channel as previously described. The mobile station immediately sets circuit 106 to a logic LO, and sends on the RVC to the land-line modem a preamble sequence (ACAC . . . ACCA) followed by a long period of the fake rate signal $R_0$. During the time the fake rate signal $R_0$ is being sent to the land-line modem, the mobile station changes power and sends an order confirmation on the reverse channel, which causes a blank and burst signal on the reverse channel.

More particularly, the mobile-end modem continues sending $R_0$ after it has received the FVC Order Message. However, the mobile radio mutes the audio path in the radio in order to send the order confirmation. After the confirmation has been sent, the mobile radio enables the audio path, and the transmission of $R_0$ continues. Hence, whereas the modem sends $R_0$ continuously without interruption, the mobile radio disconnects this signal line internally to allow the mobile radio to send the confirmation.

The fixed-end modem sees the fake rate change signals and ignores them because no two successive pairs are the same. During this period, the fixed-end modem sees a blanking of the audio path while the RVC confirmation message is being received by the cellular base station, and the RVC is not passed through to the fixed-end modem. In this respect, the fixed-end radio system operates in a similar fashion to the mobile radio system. When the cellular base station radio receives the start of the RVC confirmation message, it mutes the fixed-end received audio path such that the RVC confirmation message is not passed through to the fixed-end modem but is received by the cellular radio. The fixed end modem will ignore the reverse channel blanking if its modem register S10 is set to 0.2 seconds or greater.

The fake rate signal continues for a brief time after the unblanking, at which time the mobile station modem sends two successive rate signals $R_4$ which request the same data rate as prior to the forward channel power change order. The remainder of the rate change procedure proceeds as per V.32 bis. This whole procedure should take approximately 326.5 ms on the forward channel and probably less than 223.6 ms on the reverse channel, which is about one seventh of the time to retrain with no echo cancellation and about one eleventh of the time to retrain with echo cancellation. The estimates of the forward and reverse channel times are shown in FIG. 6.

If modem register S10 is set correctly, the fixed modem should be able to tolerate the blanking of the reverse channel that is caused by the order confirmation of the mobile station modem.

In the following analysis, it is shown that a significant increase in throughput can be achieved using a method which detects the onset of these blanking events through the cellular data orders and executes procedures to initiate a retrain procedure only when necessary.

As described in Recommendation V.32 bis, a retrain procedure for a V.32 bis modem can take between 2.4 and 3.7 seconds as a minimum. The lower value is required if no echo cancellation procedure is included, and latter higher value is required if echo cancellation is performed. These values are obtained from "FIG. 4/V.32 bis—Retrain Procedures" of Recommendation V.32 bis.

In the case of cell handoffs, a retrain procedure can (and most likely should) occur with every handoff. The time between handoffs depends on the cell diameter, vehicle speed, and the whether the cell is sectored (uses multiple directional transmitters) or not. Table 1 shows the time between handoffs and the percentage of time required for a retrain procedure for various velocities, assuming a 1 mile sector radius.

TABLE 1

| Velocity | Time Between Handoffs | Percentage of Time Required For Retrain Procedures. | |
|---|---|---|---|
| | | No Echo Cancellation | With Echo Cancellation |
| 30 m.p.h. | 120 seconds | 2.0% | 3.1% |
| 50 m.p.h. | 72 seconds | 3.3% | 5.1% |
| 60 m.p.h. | 60 seconds | 4.0% | 6.2% |

As can be seen from the data in Table 1, retrain procedures due to handoff do not require a very large percentage of the connect time. Their impact on the reduction of the channel throughput therefore is not very significant.

In the case of power control orders from the base station, an average number of eight power control orders between handoffs is typical, although this number could be as many as 14. Thus, an average of between 18.8 (no echo cancellation) and 29.2 seconds (with echo cancellation) is required if the retrain procedure is initiated as a result of power control orders made between handoffs. Table 2 shows the time between handoffs and the percentage of time required for retrain procedures for various velocities as a result of the power control orders, assuming a 1 mile sector radius.

TABLE 2

| Velocity | Time Between Handoffs | Percentage of Time Required For Retrain Procedures As a Result Of Power Control Orders. | |
|---|---|---|---|
| | | No Echo Cancellation | With Echo Cancellation |
| 30 m.p.h. | 120 seconds | 15.7% | 24.3% |
| 50 m.p.h. | 72 seconds | 26.1% | 40.6% |
| 60 m.p.h. | 60 seconds | 31.3% | 48.7% |

As can be seen from the data in Table 2, retrain procedures due to power control orders require a very large percentage of the connect time. Their impact in reduction or channel throughput therefore is very significant. This data is for an average number of power control orders. In the case of the maximum number of 14 power control orders, the retrain procedure could take as long as 32.9 to 51.1 seconds. For a vehicle moving at 30 m.p.h., this is between about 27.4% and 42.6% of the total connect time between handoffs. At a velocity of 50 m.p.h., this becomes between 45.7% to 71.0% of the total connect time!

Clearly, the foregoing mechanism which notifies the modem of a power control order, allowing it to halt transmission during the cellular blank and burst period to avoid a retrain procedure, enables significantly higher throughput to be achieved compared to a modem which does not provide such capability.

In the case of a power control order, the fixed-end modem is inhibited from performing a retrain sequence. If the message on the forward voice channel is a Handoff Voice Channel Designation Message (the SAT Color Code is set to binary 00, 01, or 10), on the other hand, the fixed-end modem is forced to immediately perform a retrain sequence. The fixed-end modem is forced into a retrain situation by the mobile subscriber unit, which follows the procedure described in section 7 of Recommendation V.32 bis. This procedure is much more complex than the rate negotiation procedure; however, only a very simple modification to this procedure is required. The handoff sequence entails the following steps:
1. Delay up to 500 ms.
2. Turn the Signalling Tone (ST) on for 50 ms.
3. Set the carrier-on-state to inactive.
4. Adjust the power level to that indicated by the VMAC field of the order.
5. Tune to the voice channel indicated by the CHAN field of the order (40 ms max).
6. Set the designated SAT color code (DSCCM) to the value of the SCC field of the order.
7. Set the carrier-on-state to active.
8. Restore the ST to its original state prior to entering the handoff subtask.

The foregoing procedure blanks the audio channel for about 600 ms. When the handoff order is received on the forward channel, what the modem does is initiate a very long (approximately 0.8 seconds) preamble sequence on the reverse channel. This prolonged preamble sequence precedes the normal retrain procedure described in Recommendation V.32 bis. This modification to the normal retrain procedure works because the specification only requires a "minimum preamble length" of about 196 symbols. If this length is extended to 1638 symbols (0.8 seconds), the landline modem can flywheel through the blanking period and then continue with the retrain procedure. The landline modem will see the reverse channel blanking followed by about 410 preamble symbols (about ¾ of the preamble symbols having been blanked out), followed by the sequence of symbols CA, etc., as prescribed in Recommendation V.32 bis.

When the mobile subscriber device receives a handoff order, indicated by a FVC Order Message with the SAT Color Code set to binary 00, 01, or 10, it immediately undertakes to do the following:

1. Clamp circuit 106, Ready For Sending, to a logic LO to inhibit any further data transmission. At the same time, clamp circuit 104, Received Data, to a logic LO.
2. Send AC for 1638 symbol periods.
3. From this point on, handle the rate negotiation as specified in V.32 bis.

Any errors in the data transfer over the voice channel as a result of the blank and burst may be corrected by either the trellis coding inherent in the V.32 bis modem trellis coding, or by an error correcting procedure such as V.42 or MNP24.

The increase in performance using the foregoing procedure may be estimated. Only the estimate for the case of power control orders will be described, since this is the case that has the largest impact on throughput. The time for each power control order has been taken to be 0.3625 seconds, the largest of the forward and reverse channel times. The percentage of time lost on the channel due to the power control orders with and without the new procedure are shown in Table 3.

TABLE 3

| Velocity | Time Between Handoffs | Percentage of Time Required For Retrain Procedures. | |
| --- | --- | --- | --- |
| | | Without New Procedure and No Echo Cancellation | With New Procedure |
| 30 m.p.h. | 120 seconds | 15.7% | 2.18% |
| 50 m.p.h. | 72 seconds | 26.1% | 3.63% |
| 60 m.p.h. | 60 seconds | 31.3% | 4.35% |

These results show a very significant reduction in the lost channel bandwidth as a result of using the described procedure.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. In a cellular mobile data communications system comprising at least one base station, a mobile station having a communications receiver including a modem with an adaptive equalizer, and means for establishing a wireless communications link between the mobile station and a first base station, a method comprising the steps of:

receiving at the modem user data communicated from the first base station across the wireless communications link;

detecting at the mobile station a blank and burst sequence associated with an order from the first base station;

during the blank and burst sequence, ceasing to receive at the modem user data communicated from the first base station across the wireless communications link; and following the blank and burst sequence, again receiving at the mobile station, without retraining the adaptive equalizer of the modem, user data communicated from the first base station across the wireless communications link.

2. The method of claim 1, wherein the order is a power-control order.

3. The method of claim 2, wherein the step of ceasing to receive comprises deasserting a ready for sending signal indicated by transmitting a predetermined signalling sequence from the mobile station to the first base station.

4. The method of claim 3, wherein the step of again receiving comprises asserting the ready for sending signal.

5. The method of claim 2, wherein the cellular mobile data communications system further comprises a second station having a communications receiver, and means for establishing a communications link between the second station and the first base station, the method comprising the further steps of:

transmitting from the mobile station to the base station on a reverse channel a confirmation message during a second blank and burst sequence; and during an interval encompassing the second blank and burst sequence, transmitting data from the mobile station to the second station through the first base station so as to prevent the second station from initiating retraining of its communications receiver.

6. The method of claim 5, wherein the step of transmitting data comprises initiating a rate negotiation procedure.

7. The method of claim 6, wherein, during the rate negotiation procedure, the mobile station first transmits to the second station dummy rate information, followed by genuine rate information.

8. The method of claim 7, wherein the genuine rate information indicates a same rate as a communications rate previous to the blank and burst sequence.

9. In a cellular mobile data communications system comprising at least one base station, a mobile station having a communications receiver, means for establishing a wireless communications link between the mobile station and a first base station, a second station having a communications receiver, and means for establishing a communications link between the second station and the first base station, a method comprising the steps of:

detecting at the mobile station a blank and burst sequence associated with an order from the first base station; and in conjunction with the blank and burst sequence, transmitting a retraining request having an extended preamble sequence from the mobile station to the second station through the first base station so as to initiate retraining of the second station's communications receiver, the extended preamble sequence having a duration such that it ends after the blank and burst signal has ended.

10. The method of claim 9, wherein the order is a handoff order.

11. The method of claim 10, wherein the step of transmitting data comprises transmitting an-extended length preamble sequence of a duration greater than a typical handoff channel blanking interval by an amount greater than a specified minimum preamble length.

12. In a cellular mobile data communications system comprising at least one base station, a mobile station having a communications receiver including a modem with an adaptive equalizer, and means for establishing a wireless communications link between the mobile station and a first base station, an apparatus comprising:

means for receiving at the modem user data communicated from the first base station across the wireless communications link;

means for detecting at the mobile station a blank and burst sequence associated with an order from the first base station;

means for, during the blank and burst sequence, ceasing to receive at the modem user data communicated from the first base station across the wireless communications link; and means for, following the blank and burst sequence, again receiving at the modem, without retraining the adaptive equalizer of the modem, user data communicated from the first base station across the wireless communications link.

13. In a cellular mobile data communications system comprising at least one base station, a mobile station having a communications receiver, means for establishing a wireless communications link between the mobile station and a first base station, a second station having a communications receiver, and means for establishing a communications link between the second station and the first base station, an apparatus comprising:

means for detecting at the mobile station a blank and burst sequence associated with an order form the first base station; and means for, in conjunction with the blank and burst sequence, transmitting a retraining request having an extended preamble sequence from the mobile station to the second station through the first base station so as to initiate retraining of the second stations's communications receiver, the extended preamble sequence having a duration such that it ends after the blank and burst signal has ended.

* * * * *